United States Patent
Al-Shaikhi et al.

(10) Patent No.: US 11,153,834 B2
(45) Date of Patent: Oct. 19, 2021

(54) METHODS AND SYSTEMS FOR ACCURATE AND ACCELERATED SYNCHRONIZATION FOR COMMUNICATION NETWORKS

(71) Applicant: King Fahd University of Petroleum and Minerals, Dhahran (SA)

(72) Inventors: Ali Al-Shaikhi, Dhahran (SA); Ahmad A Masoud, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 15/825,698

(22) Filed: Nov. 29, 2017

(65) Prior Publication Data

US 2019/0166567 A1    May 30, 2019

(51) Int. Cl.
*H04J 3/06*   (2006.01)
*H04W 56/00*  (2009.01)
*G06F 1/10*   (2006.01)

(52) U.S. Cl.
CPC .......... *H04W 56/001* (2013.01); *G06F 1/10* (2013.01)

(58) Field of Classification Search
None
See application file for complete search history.

(56) References Cited

U.S. PATENT DOCUMENTS

| | | | |
|---|---|---|---|
| 7,283,568 B2 | 10/2007 | Robie, Jr. et al. | |
| 7,394,802 B2 | 7/2008 | Jun et al. | |
| 7,817,616 B2 | 10/2010 | Park et al. | |
| 7,921,319 B2 | 4/2011 | Vertes et al. | |
| 7,961,760 B2 | 6/2011 | Lu et al. | |
| 8,571,008 B2 | 10/2013 | Kim et al. | |
| 8,670,491 B2 | 3/2014 | Na et al. | |
| 8,848,584 B2 | 9/2014 | Shin et al. | |
| 9,226,252 B2 | 12/2015 | Akhlaq et al. | |
| 9,571,378 B2 | 2/2017 | Dame | |
| 2005/0207387 A1* | 9/2005 | Middleton | ............ H04J 3/0664 370/347 |

(Continued)

FOREIGN PATENT DOCUMENTS

EP    1601124 B1    1/2008

OTHER PUBLICATIONS

Schenato et al., L., "Average TimeSynch: a consensus-based protocol for time synchronization in wireless sensor networks," Automatica 47.9 (2011), 1878-1886.

*Primary Examiner* — Phirin Sam
(74) *Attorney, Agent, or Firm* — Oblon, McClelland, Maier & Neustadt, L.L.P.

(57) ABSTRACT

The present invention contemplates a method and/or system for accurately and accelerated synchronization of communication networks. The method contemplates providing a virtual clock module in which all nodes of a network use the module in an identical manner and wherein the virtual clock module of nodes is generally a data stream whose element is the virtual time with whatever notice made is in communication with at that instant. In a preferred embodiment of the invention, the method or system is processed using a finite impulse filter. The virtual clock in each node is responsible for generating a stream of data in which one may consider as virtual time. Each sample of the discrete time stream is constructed by its nearest neighbor of the node concerned communicating the current sample of its own virtual time stream to the node.

14 Claims, 13 Drawing Sheets

(56) References Cited

U.S. PATENT DOCUMENTS

| | | | |
|---|---|---|---|
| 2008/0288655 A1* | 11/2008 | Zhao | G06Q 10/10 |
| | | | 709/238 |
| 2010/0034191 A1 | 2/2010 | Schulz | |
| 2010/0215125 A1* | 8/2010 | Furman | H04L 25/06 |
| | | | 375/319 |
| 2013/0282875 A1* | 10/2013 | Aweya | 709/219 |
| 2015/0372681 A1 | 12/2015 | Melanson et al. | |
| 2016/0112182 A1* | 4/2016 | Karnes | H04J 3/0697 |
| | | | 375/362 |
| 2016/0374043 A1 | 12/2016 | Wetterwald et al. | |
| 2017/0180108 A1* | 6/2017 | D'Eletto | H04J 3/0667 |
| 2017/0184470 A1* | 6/2017 | Rice | G01M 5/0066 |
| 2018/0331772 A1* | 11/2018 | Farra | H04B 10/0793 |

* cited by examiner

FIG. 15
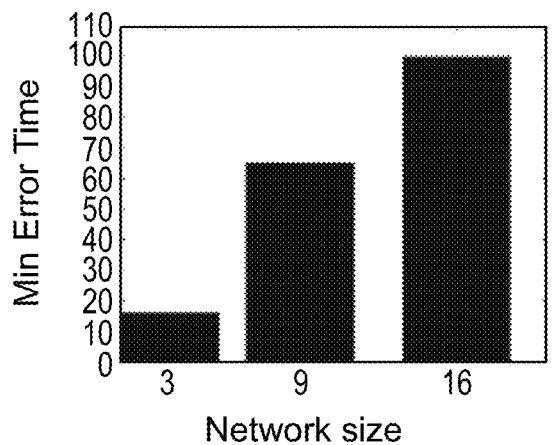
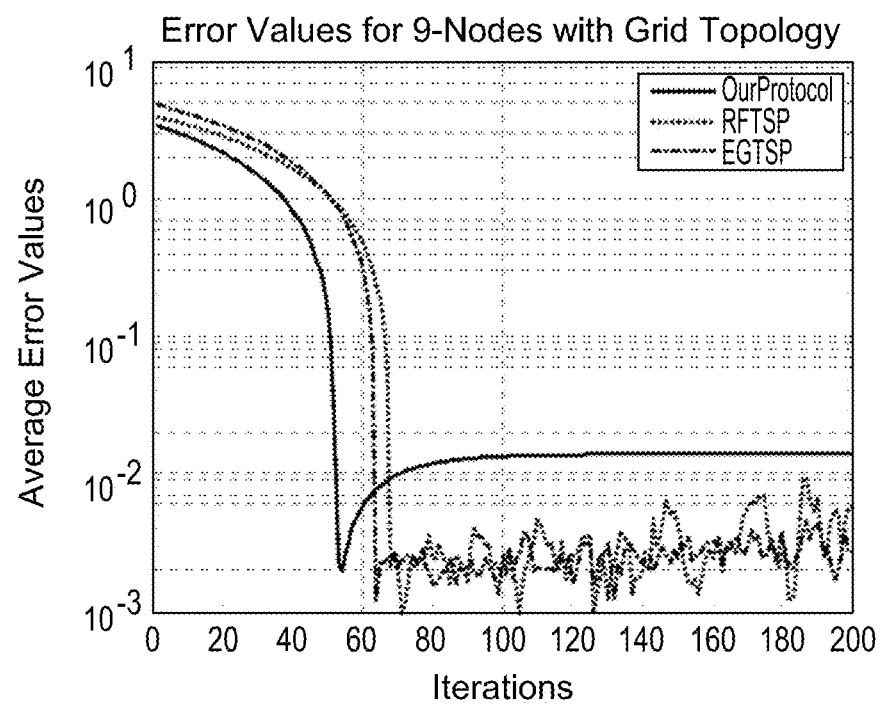
FIG. 16

METHODS AND SYSTEMS FOR ACCURATE AND ACCELERATED SYNCHRONIZATION FOR COMMUNICATION NETWORKS

FIELD OF THE INVENTION

In essence, the present invention contemplates a method and/or system for accurately and accelerated synchronization of communication networks. The method contemplates providing a virtual clock module in which all nodes of a network use the module in an identical manner and wherein the virtual clock module of nodes is generally a data stream whose element is the virtual time with whatever node the module is in communication with at that instant.

BACKGROUND OF THE INVENTION

Na et al. (U.S. Pat. No. 8,670,491) discloses a method for time synchronization in a communication network, wherein a virtual clock is produced by a controller in each network node based on the PROFINET-Standard and/or the Precision Transparent Clock Protocol. In contrast to known methods for estimating the time, the time of the virtual clock does not undergo sudden changes (see Abstract and Summary).

Wetterwald et al. (US Pat. Pub. 2016/0374043) discloses a method which comprises receiving, by an apparatus from each of a plurality of wireless sensor devices in a wireless sensor network, clock drift information associated with a clock in the corresponding wireless sensor device; determining for each wireless sensor device, by the apparatus, an expected clock drift based at least on the clock drift information from the corresponding wireless sensor device; and sending, by the apparatus to each wireless sensor device, a corresponding drift compensation command for correcting the corresponding expected clock drift, enabling controlled synchronization of the corresponding wireless sensor device within the wireless sensor network (see Abstract and Summary).

Park et al. (U.S. Pat. No. 7,817,616) discloses a time synchronization method in a wireless sensor network, which has an upper node that provides back-off scheduling to lower nodes in the wireless sensor network of a hierarchical structure. Each of the lower nodes synchronizes time according to the back-off scheduling based on its local clock (see Abstract and Summary).

Robie et al. (U.S. Pat. No. 7,283,568) discloses synchronizing clocks in a computer network. A first node clock is synchronized to a second node clock by establishing an initial value of a virtual second node clock at the first node. The initial value may be established based on the first node clock and a timing record received from the second node. A frequency bias adjustment factor is determined for the virtual second node clock based on a plurality of clock requests from the first node and a plurality of corresponding responses from the second node spaced apart in time (see Abstract and Summary).

Akhlaq et al. (U.S. Pat. No. 9,226,252) discloses a recursive time synchronization protocol method for wireless sensor networks which provides a modified and extended RTSP method to make it work with clustered networks. In case of non-clustered or flat network, each node is assumed to be a clusterhead in order to run the RTSP method correctly. The RTSP method involves the election of a reference node, and compensation for offset and drift (see Abstract and Summary).

SUMMARY OF THE INVENTION

In essence, the present invention contemplates a method and/or system for accurately and accelerated synchronization of communication networks. The method contemplates providing a virtual clock module in which all nodes of a network use the module in an identical manner and wherein the vertical clock module of nodes is generally a data stream whose element is the virtual time with whatever notice made is in communication with at that instant.

In a preferred embodiment of the invention, the method or system in accordance with claim 1, wherein the method is processed using a finite impulse filter. The virtual clock in each node is responsible for generating a stream of data which one may consider as virtual time. Each sample of the discrete time stream is constructed by its nearest neighbor of the node concerned communicating the current sample of their own virtual time stream to the node. In such cases, it is not important for the node concerned to know from which node a virtual time sample comes from. The node concerned simply averages whatever virtual time sample it receives at a certain instant to create its own discrete stream, virtual time sample. It should be recognized that the virtual time discrete sample stream is not equal to the actual discrete time stream of the server node which all the nodes of the sensor network want to synchronize with. There is an error between the two and the node concerned has to detect, as fast as possible, the discrete instant in time at which this error drops to a minimum value or to an acceptable level. When this instant is detected the virtual time stream at that instant is considered as the true time stream of the server and is used to reset the local physical clock of the node. The discrete finite impulse response filter detects that instant. Thus a lock node will pass the discrete time stream it is synthesizing through the discrete filter. The filter is constructed to that the minimum error instant at which the sample of the nodes virtual time stream is closest to the true time is marked by a transition of the filter's output from positive to negative.

DESCRIPTION OF THE DRAWINGS

FIG. 15 is the time at which minimum error occurred versus network size;

FIG. 16 is the error in all nine nodes averaged as a function of iteration; and

The invention will now be described in connection with the accompanying drawings wherein like reference numbers are used to identify like parts.

DETAILED DESCRIPTION OF THE PREFERRED EMBODIMENTS OF THE INVENTION 1.0 Summary of Invention/Detailed Description:

The nodes of a network with an impoverished infrastructure are difficult to synchronize. Since they are built from cheap hardware, their clocks are highly likely to suffer significant drift. These nodes also have a limited power supply that does not support the energy drain the frequent communication requires. The nodes of such networks, such as in sensor networks, will most probably be deployed in large numbers in harsh and RF challenged environments in which wide horizon broadcast is not possible and connectivity is unstructured and intermittent. Also, the probability of failure of such nodes is high. Therefore, making the synchronization procedure heavily dependent on a node's ID or using multi-hop communication is not desirable.

In this patent, Applicants suggest a decentralized and self-organizing procedure for synchronizing communication networks that do not have an infrastructure. The procedure is light, produces high accuracy using a small number of communication exchange with other nodes, uses only single hop communication and can function satisfactorily even when connectivity is unstructured and/or random.

Figure 1:
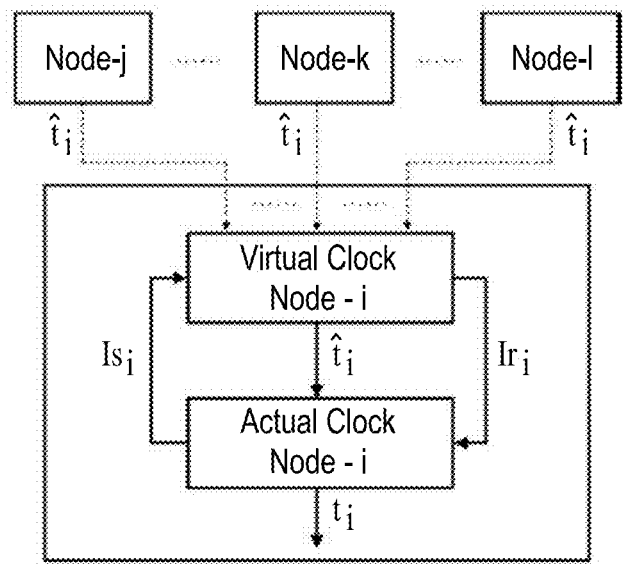
FIG. 1 is a suggested setup for a node synchronization.
Figure 2:
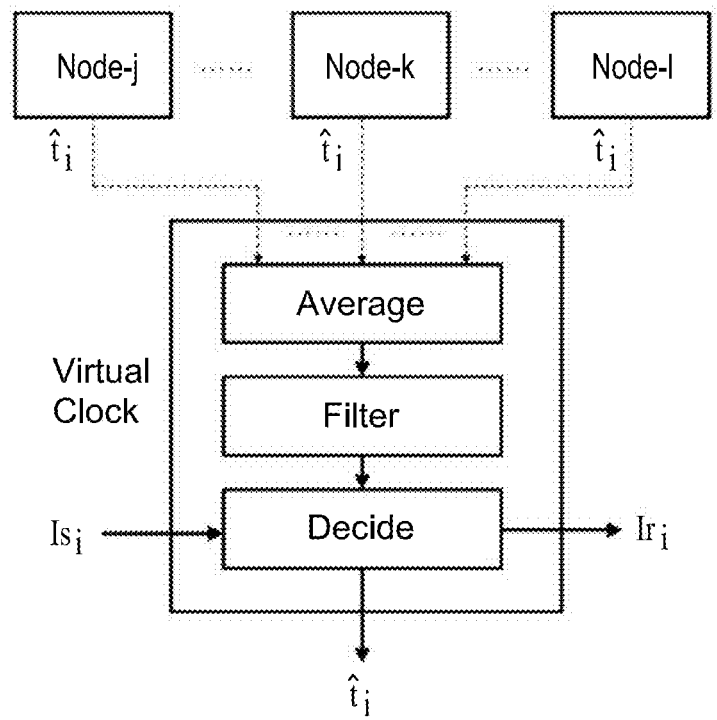
FIG. 2 illustrates the structure of the suggested virtual clock.
Figure 3:
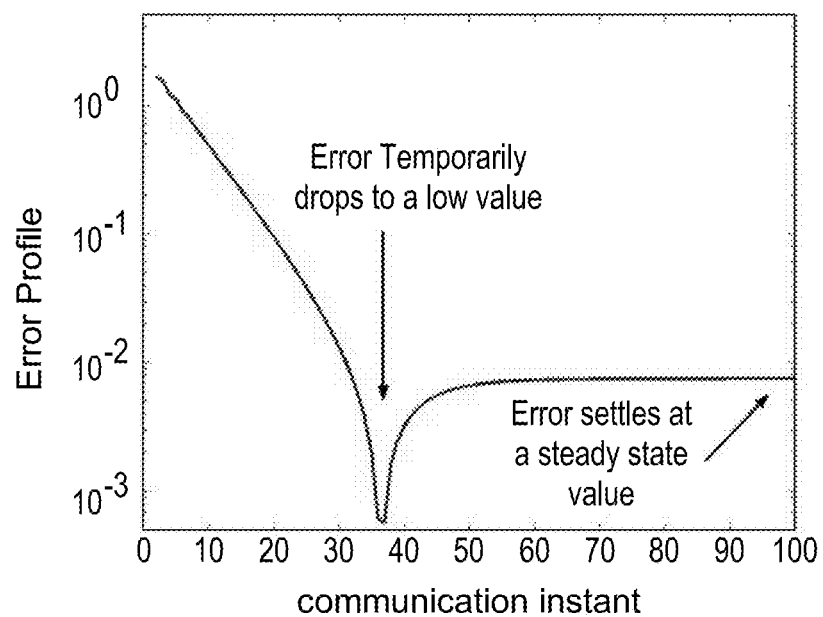
FIG. 3 is a typical pattern of error (local time-server time) versus communication instants.

The procedure constructs a virtual clock (FIG. 1) which all nodes of the network use in an identical manner. The virtual clock module of node-i generates a data stream whose element is the virtual time of the nodes. The virtual time at a certain instant is taken as the average of the virtual time with whatever nodes node-i is communicating with at that instant as shown in FIG. 2. The error formed by comparing the local sequence of average times to exact master node time is found to settle to a constant value that is relatively low. However, it is noticed that before convergence the error temporarily drops then climbs back again. A typical profile of the error is shown in FIG. 3. By interrupting the averaging process at the proper time while the computation is still in transient state, one can significantly enhance accuracy (orders of magnitude better than steady state). One can also significantly reduce the communication attempts a node makes in order to synchronize with other nodes, hence quickly synchronizing the network and significantly reduce the energy drain due to communication.

Figure 4:
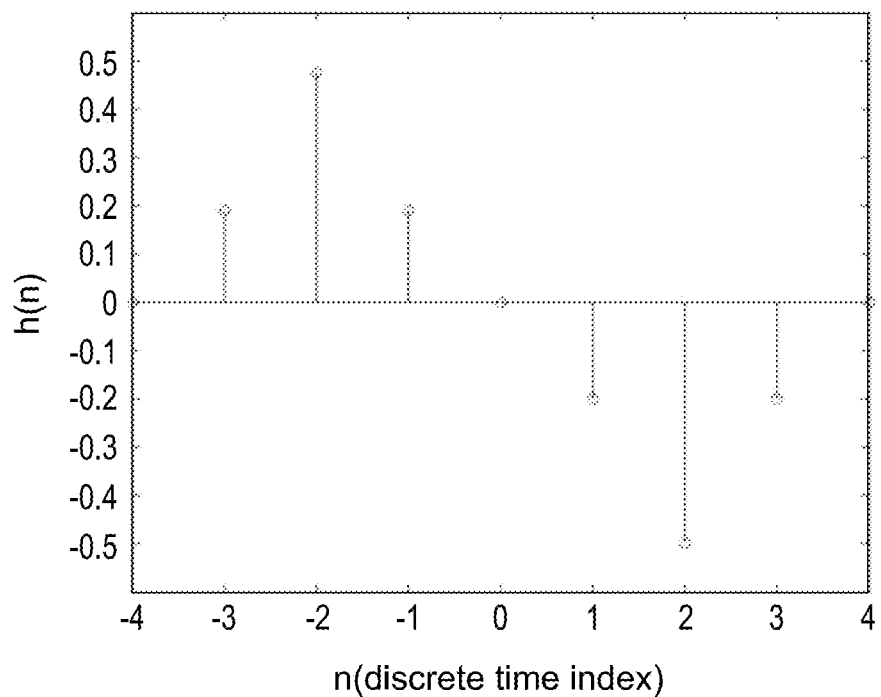
FIG. 4 is the discrete pulse response of the processing filer.

In order to detect the transient communication instant at which system's accuracy is high, the sequence is first processed using a finite impulse filter, h(n), whose pulse sequence is shown in FIG. 4. The filter is matched to the pattern in $\hat{t}_i$ which indicates that the synthetic time is close to the global time of the network (the time of the master node, $t_m$). The stream from the filter is then examined by a decision rule to select the instant at which a sample from the average time stream ($\hat{t}_i$) is selected as the global time, which the physical local clock should be reset to. When the condition becomes valid, $Ir_i$ is set to 1, the value of the physical clock is reset to the selected virtual time, and node-i seizes communication. Once the physical clock is reset, a counter is started in order to wake-up the virtual clock a time Tw after the physical clock is reset. This is done by setting the variable $Is_i=1$. Tw is selected based on the quality of the physical clock and its tendency to drift. The desired accuracy and how much communication the node is allowed to devote to synchronization are also a factor in selecting Tw.

Figure 5:
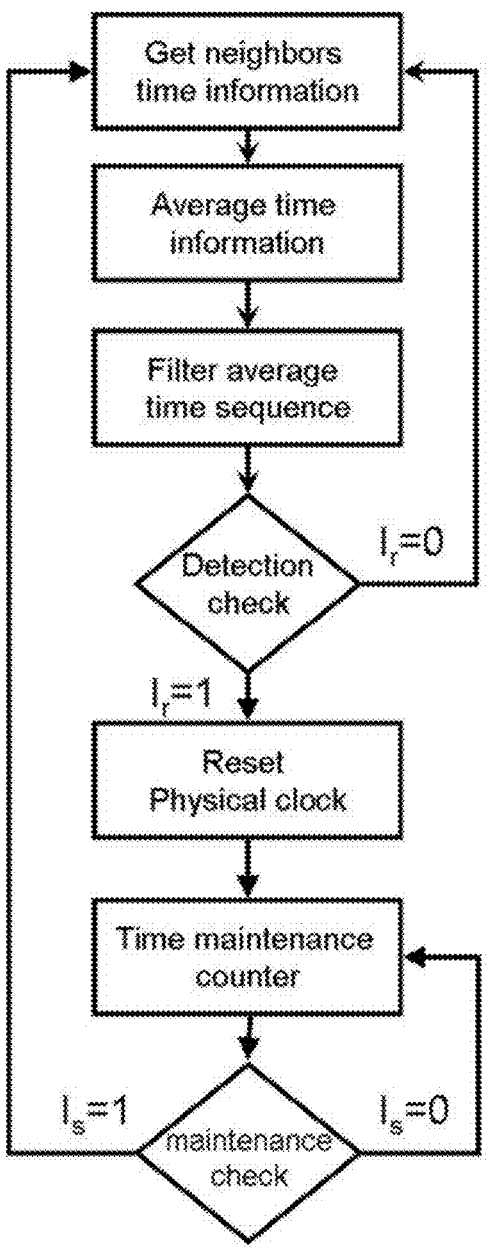
FIG. 5 is the work flow of the synchronization protocol used by the nodes.

An overall flow of how the synchronization procedure works is described by the flowchart in FIG. 5. The following describes in details each block of the synchronization workflow.

Get neighbors' time information:
1—If $I_s=1$, then
2—Detect the transmission of the neighboring K nodes (K≥0)
3—For each one of the K neighbors, define the binary variable $C_j$ j=1, . . K, such that $C_j=0$ if the j'th neighbor is to be ignored and $C_j=1$ if the neighbor is to be used in synchronizing the node's time
4—Store the time each node broadcast in $\hat{t}_j$ j=1, . . . K
Average time information:
1. Construct $C=\Sigma_{j=1}^{K} C_j$
2. If C=0, then keep virtual time unchanged ($\hat{t}_i(n)=\hat{t}_i(n-1)+\Delta T$)
3. Else update virtual time of node-i $$\hat{t}_i(n) = \frac{1}{C}\sum_{j=1}^{K} C_j \cdot \hat{t}_j(n)$$

Filter average time sequence:
The virtual time sequence of node-i created by the averaging process is filtered using the Finite Impulse Response (FIR) filter (h(n)):

$$h(n)=c_f 0.2 \cdot \delta_{n+3}+c_f 0.5 \cdot \delta_{n+2}+c_f 0.2 \cdot \delta_{n+1}+c_f 0 \cdot \delta_n - 0.2 \cdot \delta_{n-1} - 0.5 \cdot_{n-2} - 0.2 \cdot \delta_{n-3}$$

where $c_f$ is a positive constant whose value is close to unity ($0.95 \geq c_f \geq 1.05$).

The filter is a modified difference filter with weighted coefficients. The filter is used to detect the minimum point of the time sequence and it produces the filtered sequence given by:

$$d(n)=h(n) \times \hat{t}_i(n)$$

where * is the discrete convolution operator.
Detection check & Reset Physical clock
1—Ignore the first L samples of d(n) since they are fluctuating (Applicants found that L=13 is enough)
2—if at ns, d(ns) changes signs (d(ns)*d(ns−1)<0), then
3—$I_r=1$, $I_s=0$,
4—$t_i(ns)=\hat{t}_i(ns)$
Time maintenance counter & maintenance check
1—If $(t_i(ns)+Tw)-\hat{t}_i(n)<0$, then Is=1, Go to "get neighbors time" stage
Symbols & Abbreviations:
$t_m$: Time of the master node of the network. This node need not to be labeled, it can stay anonymous. Its time is generated by a physical clock and need not to be computed.
$t_i$: Time registered by the physical clock of node i
$\hat{t}$: Time computed by the virtual clock of node i
$Is_i$: A binary set variable of node i, if its value=1, its virtual clock is activated
$Ir_i$: A binary reset variable of node i, if its value=1 the value of the physical clock is reset to the value computed by the virtual clock
h(n): The coefficients of the finite impulse response filter used to process the time average sequence,
d(n): Filtered virtual time sequence (d(n)=h(n)*$\hat{t}_i(n)$)
Tw: Estimate refresh time during which communication seizes and the virtual clock is inactive
n: Discrete time index which represents an instant at which a virtual time estimate is updated ns: Discrete time instant at which a decision is made that the virtual time is close to the global time K: The number of neighboring nodes whose transmission is detected by node i $C_j$: A binary inclusion factor (j=1, .. K). If node i decides to include node j in synchronizing its time, it sets $C_j$ to 1, else $C_j$ is set to zero.

$\delta_n$: it is the Kronecker delta function ($\delta_n$=1 for n=0, else $\delta_n$=0)

L: Number of discrete time steps to wait before attempting to use d(n) to identify the discrete time instant at which the virtual time is close to global time ΔT: Clock cycle Each node of the network (i.e. it is a synchronization protocol) can identically use the synchronization procedure. Therefore, deploying the synchronization procedure on a network is as simple as downloading the protocol to the individual nodes.

The procedure is simple and can be used by networks built from inexpensive hardware.

The synchronization procedure does work for any deterministic network topology provided that the network is connected.

The synchronization procedure does work when the communication network has random connectivity.

The performance of the synchronization procedure gracefully degrades with communication link availability.

The procedure is scalable for large scale network.

The procedure treats the master node (gateway) in the same manner as the other nodes of the network.

The nodes need not be initially set to the same time in order for the procedure to function. Even if the nodes initially start with random values for time, they will all converge to the same value. This enables the addition or removal of nodes while the network is operating without endangering the network ability to synchronize.

The procedure uses low number of communication exchange. This leads to significant energy conservation. It also uses the physical clock to totally turn off communication when it is not needed.

The procedure is decentralized, self-correcting and self-maintaining.

It uses only single hop messaging which is more reliable than multi-hop messaging. Single hop communication or messaging, means that a node needs only the information of the nodes that are of direct communication with it. Two hop messaging means that a node needs the information of the nodes that are directly communicating with it and the nodes that are directly in communication to those nodes but do not have a communication link with the node concerned and so on for three, four, . . . hop communication. Multi-hop communication is very expensive in terms of depleting the energy of the battery, making the performance shaky and dependent on the proper functioning of all the nodes and increasing the complexity of processing in terms having to maintain routing tables and having to give the nodes unique identifiers (i.e. node labeling). Single-hop communication does not require all of the above.

The procedure links performance to the quality of the hardware. If the nodes can carry communication at a fast rate, then the error in synchronization can be reduced. Also if the quality of the physical clocks used is high, then there is no need for frequent maintenance of the quality of synchronization.

The procedure has a fast rate of convergence and can quickly synchronize a network.

The procedure, despite its simplicity, can yield accurate synchronization relative to the data exchange rate among the nodes.

The synchronization procedure does not depend on rigid network wide node labeling in order to function. Instead, it uses, short-term dynamic, node-centered labeling. This makes it suitable for large scale networks operating in harsh environments where network discovery is difficult or impossible.

The work reported in this patent has not been published previously. However, an extensive literature review was conducted and no similar procedures for synchronizing networks were found.

The idea of using virtual clocks for synchronizing communication networks without infrastructure is fairly recent. It individuated from an area called consensus control. The observation below, however, may explain why Applicants work address the practical issues needed to satisfactorily synchronize a physical communication network without infrastructure:

1—The synchronization accuracy of most existing methods that use a virtual clock concept is relatively low and is not suitable for practical operation 2—To the best of Applicants' knowledge, the methods keep the virtual clocks running for a long time until steady state is reached. This uses excessive communication and causes battery depletion 3—Applicants did not see procedures where virtual clocks and physical clocks are combined to create a synchronized timing system. The cause of that could be the inability to determine specific points in time to stop the virtual clock and reactivate it again 4—Some techniques on virtual clocks attempted to improve accuracy by augmenting averaging with other operations such as integration. The result was to jeopardize stability of the virtual clock. This also imposed severe limitations on the structure of the network and led to the loss of unconditional stability that allowed flexibility in network connectivity and operation when connectivity is time variant 5—Applicants have not seen any of the virtual clock suggested up to now implemented on an actual communication network with no infrastructure (e.g. a sensor network).

Figure 6:
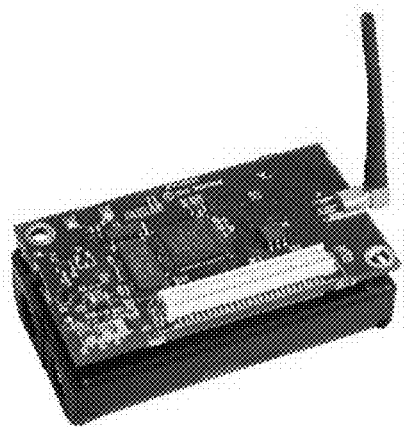
FIG. 6 is the MICAz wireless sensor node.

5.0 Data Analysis:

The properties of the suggested synchronization protocol is thoroughly tested using both simulation and physical experiments using the MICAz which is a 2.4 GHz, IEEE/ZigBee 802.15.4, board (FIG. 6).

Figure 7:
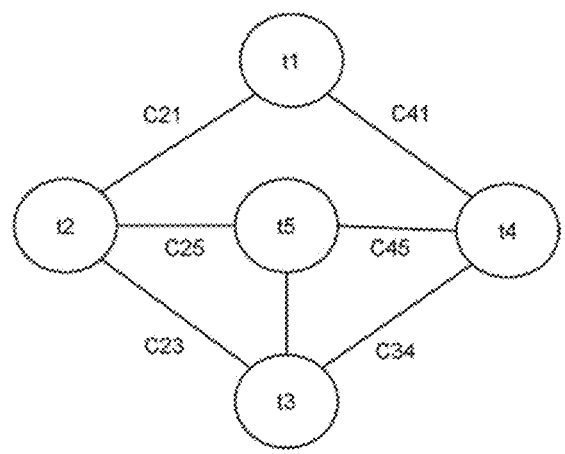
FIG. 7 is a test network.
Figure 8:
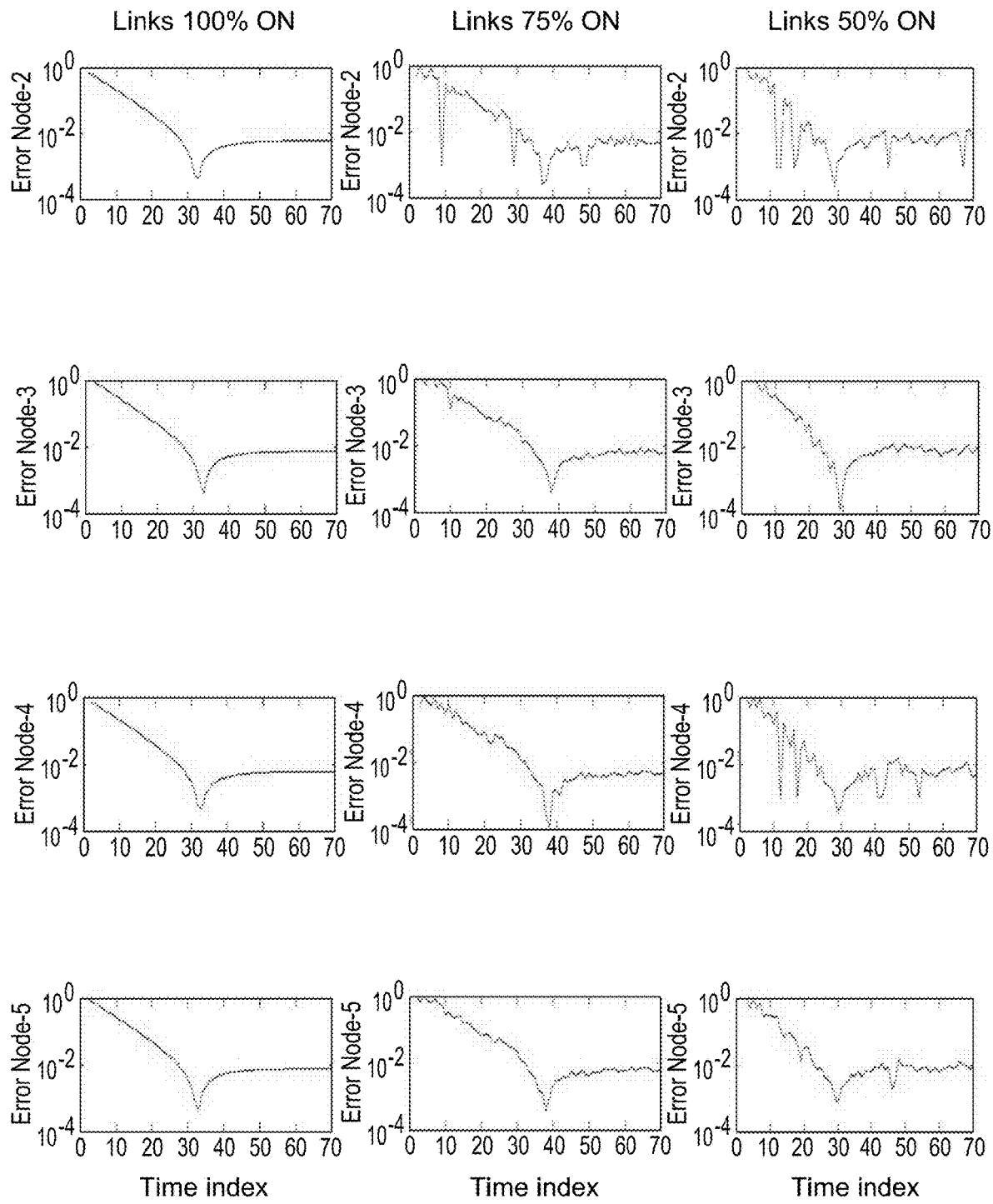
FIG. 8 is the node error profile for the network in FIG. 7 for different values of channel availability.

To test the error profile created by the averaging procedure, in particular the transient dip in the error profile, the test network in FIG. 7 is simulated. Node-1 is selected as the master node (a stubborn node). A communication rate of 1 KHz is used. A connectivity function, $f(C_{i,j})$ among nodes is modeled as Bernoulli random variable with a discrete probability distribution function:

$$f(C_{i,j}) = \begin{bmatrix} p & C_{i,j} = 1 \\ 1-p & C_{i,j} = 0 \end{bmatrix}$$

where p is the probability that the channel is on and the nodes are communicating. FIG. 8 shows the error profile for each node taken at three values for p: p=1 where the links are available 100% of the time, p=0.75 and p=0.5 where communication links malfunction 25% and 50% of the time, respectively. As can be seen from the case where the communication channels are fully available, the transient dip in error appeared in all nodes where the time error for each node with respect to the master nodes is orders of magnitude less than the steady state error. The communication instants at which the minimum error for each node was attained were close. The profile reasonably persisted for a relatively high channel outage rate. All experimental results corroborated the simulation results.

Figure 9:
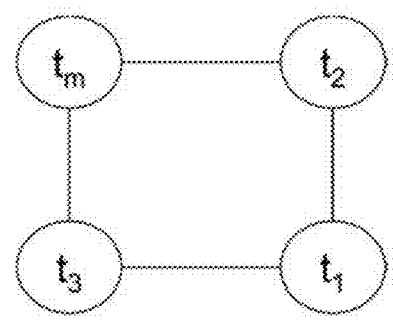
FIG. 9 is the four nodes ring topology, experimental data.
Figure 10:
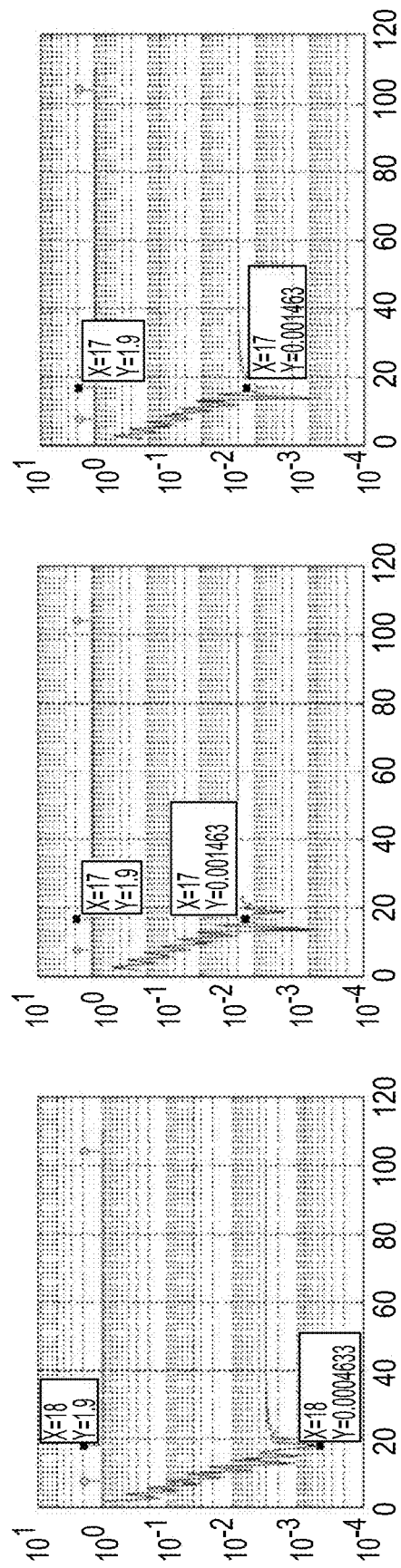
FIG. 10 is the error and detection signal of the nodes in FIG. 9.

In FIG. 9, four MICAz sensor nodes are used to implement a ring topology network with one master node and three other nodes attempting to synchronize with it. Data exchange and estimate update is carried out at a rate of 1 KHz. The virtual time computed by the nodes is compared with that of the master node and the error signal is computed. The local times are also processed to determine the instant at which the virtual clock should stop. The graphs of the error and the detection are shown in FIG. 10. The exact data of the network is shown in Table 1. As can be seen, the minimum value the error reaches is less than 50 microseconds for all the nodes which takes place in the early cycles of the message exchange (at most 18 updates). Also, all nodes attained their minimum around the same time within only four update cycles. The value of the steady state error is much higher than the minimum (more than 2 milli-seconds) for all nodes and consumed close to three times the number of communication exchange. The suggested filter and decision maker selected the detection instants early in the communication exchange close to where the minimum occurs. The error of the selected virtual time is much better than that of steady state and in some cases is close to the minimum achievable error.

TABLE 1 detection data corresponding to FIG. 10

| | Exact | | Steady state | | Detected | |
|---|---|---|---|---|---|---|
| Nodes | Iterations | Error | Iterations | Error | Iterations | Error |
| N1 | 18 | 0.000463281 | 47 | 0.002999968 | 18 | 0.000463281 |
| N2 | 14 | 6.48437E−05 | 46 | 0.001999968 | 17 | 0.001463281 |
| N3 | 14 | 6.48437E−05 | 46 | 0.001999968 | 17 | 0.001463281 |
| Max | 18 | 0.000463281 | 47 | 0.002999968 | 18 | 0.001463281 |
| Min | 14 | 6.48437E−05 | 46 | 0.001999968 | 17 | 0.000463281 |

Figure 11:
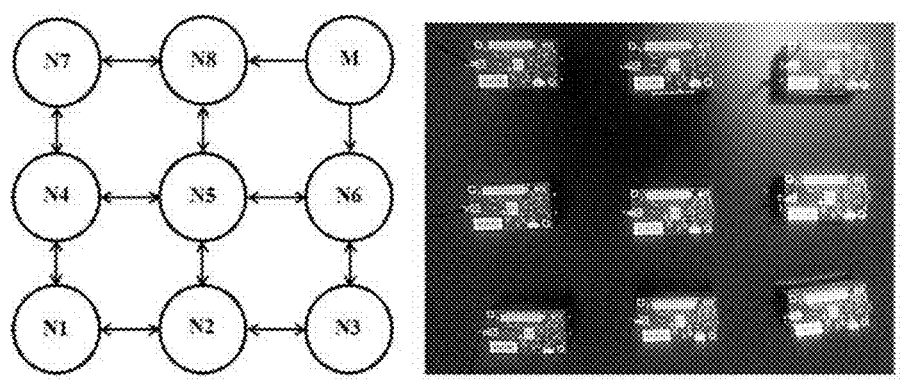
FIG. 11 is a nine-node network.
Figure 12:
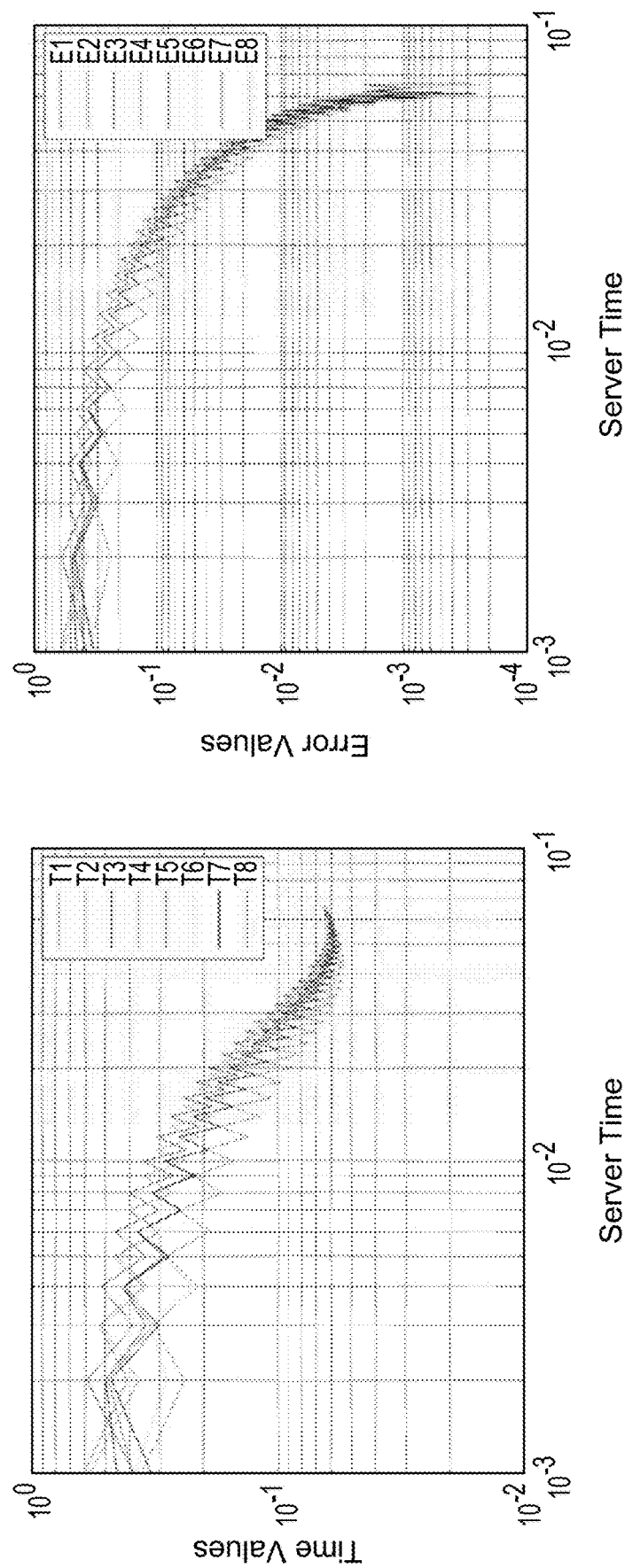
FIG. 12 is the virtual clock time and error for each node of the circuit in FIG. 11.

The synchronization protocol is tested on a nine-node network (FIG. 11). The evolution of the time estimate until the virtual clock is stopped for each node alone with the corresponding error relative to the master node is shown in FIG. 12. The same observations as in the previous case are recorded as shown in Table 2. All nodes exhibited a sharp, transient drop in error early in the message exchange that is significantly lower than the steady state value. The suggested protocol was able to detect this dip in error and synchronized the nodes at an accuracy that is much better than that of steady state and largely comparable to the maximum achievable accuracy.

TABLE 2

Time estimate characteristics for the nodes in FIG. 11

| | Exact | | Steady State | | Detected | |
|---|---|---|---|---|---|---|
| Nodes | Iterations | Error | Iterations | Error | Iterations | Error |
| N1 | 67 | 0.000271674 | 195 | 0.007998733 | 67 | 0.000271674 |
| N2 | 61 | 0.000210105 | 194 | 0.007498733 | 66 | 0.000228326 |
| N3 | 67 | 0.000247653 | 191 | 0.006498654 | 64 | 0.001056578 |
| N4 | 61 | 0.000210105 | 194 | 0.007498733 | 66 | 0.000228326 |
| N5 | 67 | 0.000247653 | 191 | 0.006498654 | 64 | 0.001056578 |
| N6 | 61 | 0.000265107 | 187 | 0.004499105 | 59 | 0.000960327 |
| N7 | 67 | 0.000247653 | 191 | 0.006498654 | 64 | 0.001056578 |
| N8 | 61 | 0.000265107 | 187 | 0.004499105 | 59 | 0.000960327 |
| Maximum | 67 | 0.000271674 | 195 | 0.007998733 | 67 | 0.001056578 |
| Minimum | 61 | 0.000210105 | 187 | 0.004499105 | 59 | 0.000228326 |

Figure 13:
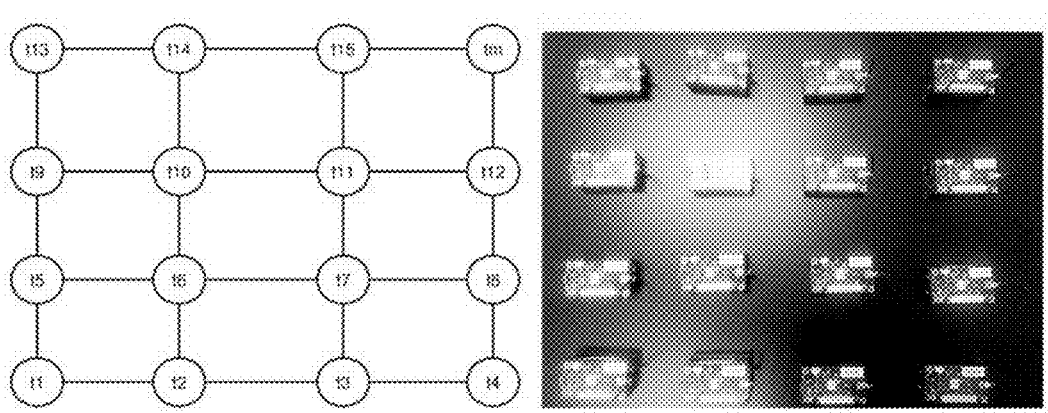
FIG. 13 is a sixteen-node network.
Figure 14:
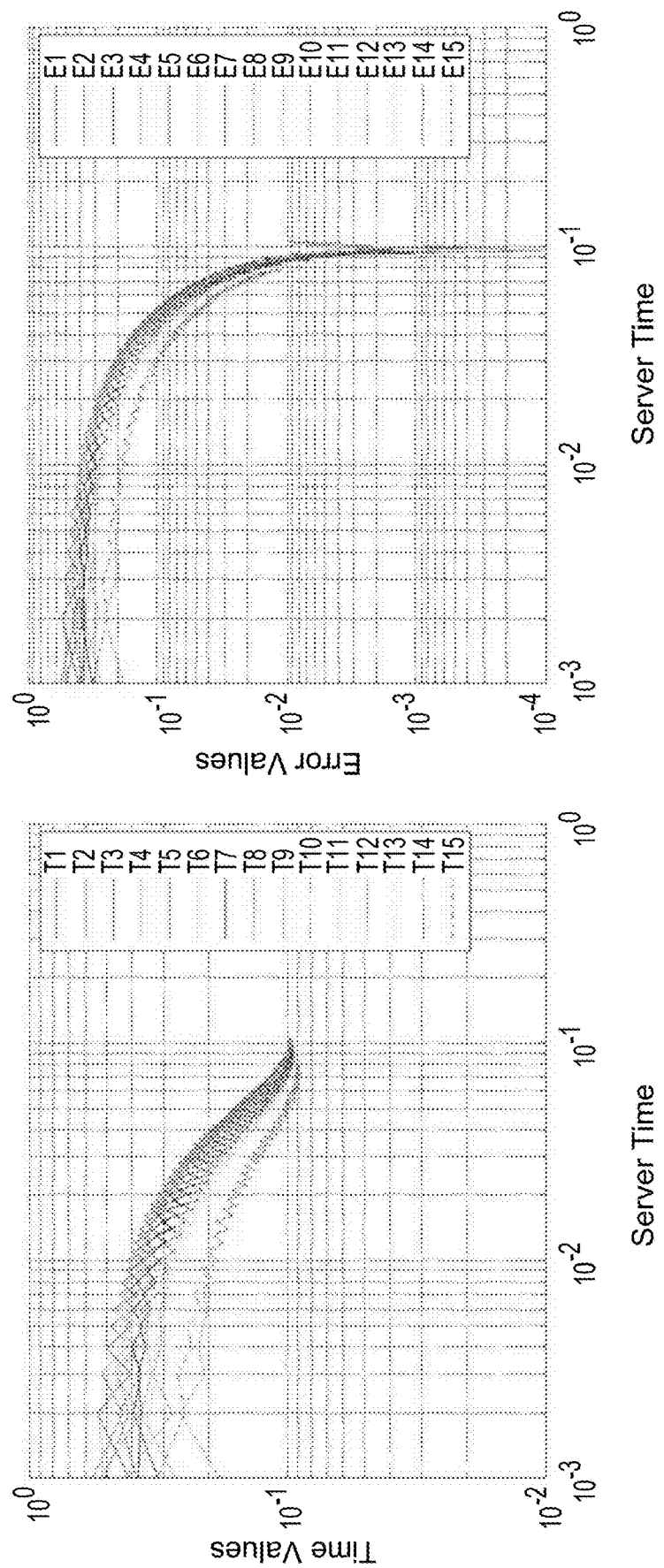
FIG. 14 is the virtual clock time and error for each node of the circuit in FIG. 13.

A larger sixteen-node network is tested (FIG. 13). The evolution of the time estimate until the virtual clock is stopped for each node alone with the corresponding error relative to the master node is shown in FIG. 14. The same observations as in the previous case are recorded as shown in Table 3. Interestingly, as the size of the network increased, accuracy also improved and more saving in the number of message exchange needed to synchronize the network, relative to steady state, is obtained.

TABLE 3

Time estimate characteristics for the nodes in FIG. 13

| Nodes | Exact Iterations | Exact Error Value | Steady State Iterations | Steady State Error Value | Detected Iterations | Detected Error Value |
|---|---|---|---|---|---|---|
| N1 | 96 | 0.00010285 | 447 | 0.041338725 | 106 | 0.00957014 |
| N2 | 100 | 0.00033942 | 446 | 0.040388725 | 105 | 0.00862014 |
| N3 | 96 | 0.000315173 | 444 | 0.038149931 | 103 | 0.002891579 |
| N4 | 100 | 0.000188637 | 441 | 0.035842747 | 100 | 0.000188637 |
| N5 | 100 | 0.00033942 | 446 | 0.040388725 | 105 | 0.00862014 |
| N6 | 96 | 0.000215716 | 444 | 0.038828428 | 104 | 0.007612213 |
| N7 | 100 | 0.000200307 | 441 | 0.035367798 | 100 | 0.000200307 |
| N8 | 99 | 0.000459066 | 436 | 0.0316356 | 96 | 0.000669474 |
| N9 | 96 | 0.000315173 | 444 | 0.038149931 | 103 | 0.002891579 |
| N10 | 100 | 0.000200307 | 441 | 0.035367798 | 100 | 0.000200307 |
| N11 | 99 | 0.000284579 | 433 | 0.029056619 | 92 | 0.002428683 |
| N12 | 95 | 1.00546E−05 | 420 | 0.020845853 | 80 | 0.014000267 |
| N13 | 100 | 0.000188637 | 441 | 0.035842747 | 100 | 0.000188637 |
| N14 | 99 | 0.000459066 | 436 | 0.0316356 | 96 | 0.000669474 |
| N15 | 95 | 1.00546E−05 | 420 | 0.020845853 | 80 | 0.014000268 |
| Maximum | 100 | 0.000459066 | 447 | 0.041338725 | 106 | 0.014000268 |
| Minimum | 95 | 1.00546E−05 | 420 | 0.020845853 | 80 | 0.000188637 |

It is interesting to notice that the growth in the synchronization time versus the size of the network is almost linear as shown in FIG. 15. This is a good indicator that the protocol is scalable for large-scale networks.

In the following Applicants compare the protocol with the two popular protocols: Rated Flooding Time Synchronization Protocol (RFTSP) and Energy-Efficient Gradient Time Synchronization Protocol (EGTSP). Table 4 describes the specifications of the RFTSP, EGTSP and the proposed protocol. As can be seen from the table, from a practical point of view, the suggested protocol competes with the other two protocol.

TABLE 4

Specifications of three protocols

| Specification | RFTSP | EGTSP | Our Protocol |
|---|---|---|---|
| Type | Centralized/Tree | Distributed | Distributed |
| Reference/Root Node | Reference/Root Node to start the Flooding Process | Broadcasting Packet contain the local information about the neighbours to start periodically the updates | Directly communicate with the neighbours and no reference node |
| Failures | Node/Link Failures | None | None |
| Overhead Problem | High overhead, power consumption is high and life of time is low | Less overhead, power efficient and high life of time comparing with FTSP | Suitable for dense network, power efficient and high life of time |
| Communication Type | Multi Hop Communication | Single Hop Communication | Single Hop Communication |
| Compensation | Compensate drift and offset at the same time | Compensate drift and offset individually | Compensate drift and offset at the same time |
| Communication Cycles | High | Medium | Low |

Figure 17:
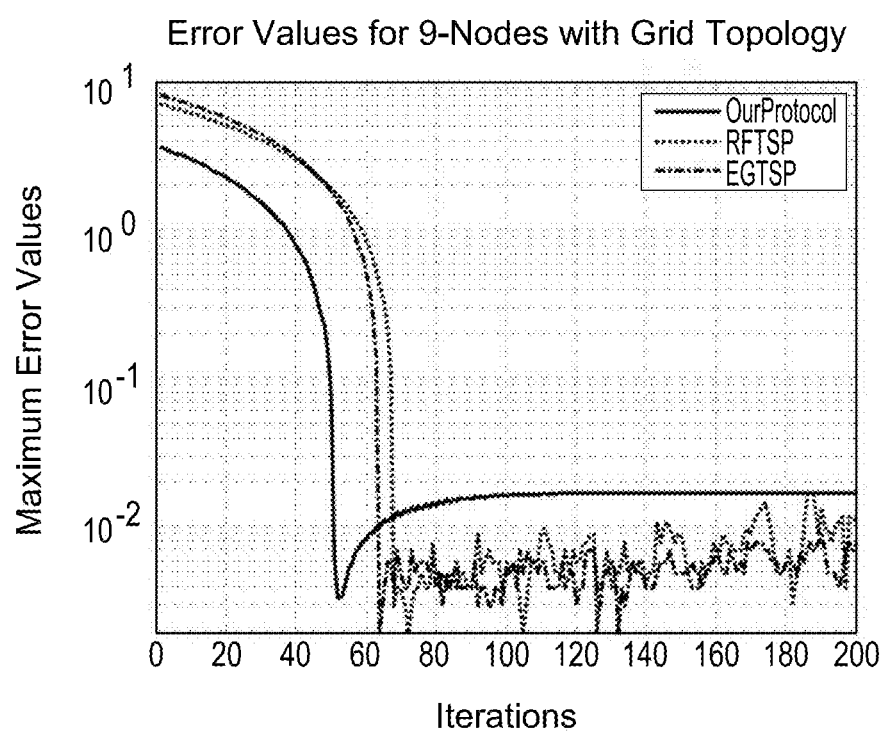
FIG. 17 is the maximum error in all nine nodes averaged as a function of iteration.

FIGS. 16 and 17 demonstrates clearly that the suggested synchronization protocol competes with the other two protocols. First, the convergence of the suggested protocol is faster than the other two. This leads to saving in energy needed for communication. Also, unlike the other two, the time to stop the protocol and declare the circuit synchronized is well defined. As for the accuracy, it matches, even beats, the other two.

While the invention has been defined in accordance with its preferred embodiments, it should be recognized that changes and modifications may be made therein without departing from the scope of the appended claims.

What is claimed is:

1. A system for accurately and accelerated synchronization of communication networks, said system comprising a virtual clock module in which all nodes of a network use the material in an identical manner and wherein the virtual clock module of nodes is a data stream whose element is the virtual time with whatever node the module is in communication with at that instant;
the procedure constructs a virtual clock in which all nodes used in an identical manner and generate a data stream whose element is the virtual time with whatever node the module is in communication with at that instant and wherein the method is processed using a finite impulse filter.

2. The system for accurately and accelerated synchronization of communication networks according to claim 1, in which the procedure is simple and used by networks built from inexpensive hardware.

3. The system for accurately and accelerated synchronization of communication networks according to claim 1, in which the procedure works for any deterministic network typology provided that the network is connected.

4. The system for accurately and accelerated synchronization of communication networks according to claim 1, in which the synchronization procedure works when the communication network has random connectivity.

5. The system for accurately and accelerated synchronization of communication networks according to claim 1, in which the performance of the synchronization procedure degrades with communication link availability.

6. The system for accurately and accelerated synchronization of communication networks according to claim 1, in which the procedure is scalable for a large scale network.

7. The system for accurately and accelerated synchronization of communication networks according to claim 1, in which the procedure treats a master node or gateway node in the same manner as the other nodes of the network.

8. The system for accurately and accelerated synchronization of communication networks according to claim 1, in which the nodes need not be initially set to the same time in order for the procedure to function.

9. The system for accurately and accelerated synchronization of communication networks according to claim 1, in which said procedure uses a low number of communication exchanges and leads to significant energy conservation and includes said physical clock to totally turn off communication when it is not needed.

10. The system for accurately and accelerated synchronization of communication networks according to claim 1, in which said procedure is decentralized, self-correcting and self-maintaining.

11. The system for accurately and accelerated synchronization of communication networks according to claim 1, in which said system uses only single hop messaging.

12. The system for accurately and accelerated synchronization of communication networks according to claim 1, in which said procedure links performance to the quality of the hardware and if the nodes carry communication at a fast rate then the error is synchronization can be reduced, also if the quality of the physical clocks used is high there is no need for frequent maintenance of the quality of synchronization.

13. The system for accurately and accelerated synchronization of communication networks according to claim 1, in which said finite impulse filter is a pattern detector.

14. The system for accurately and accelerated synchronization of communication networks according to claim 1, in which said finite impulse filter is an event detector.

* * * * *